A. G. W. FOSTER.
PLOW.
No. 176,465. Patented April 25, 1876.
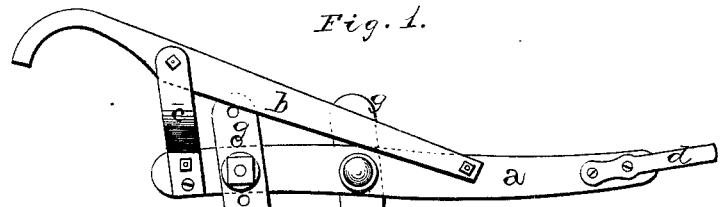
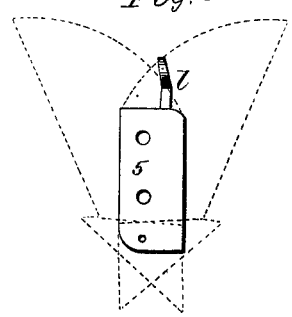
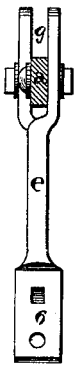
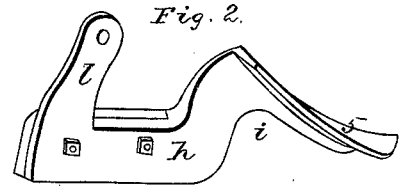
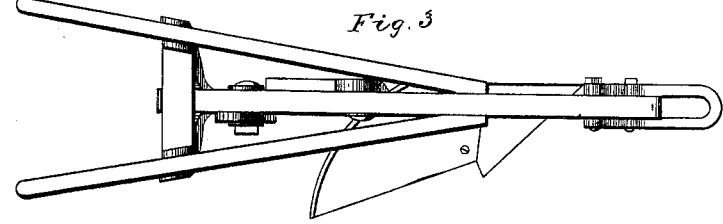
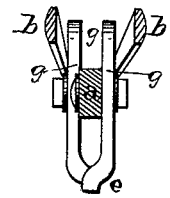
WITNESSES.
J. Wm Garner
Frank M Burnham
INVENTOR:
A. G. W. Foster,
per
F. A. Lehmann, Atty.
N. PETERS, PHOTO-LITHOGRAPHER, WASHINGTON, D. C.

UNITED STATES PATENT OFFICE.

ABRAHAM G. W. FOSTER, OF NEWNAN, GEORGIA.

IMPROVEMENT IN PLOWS.

Specification forming part of Letters Patent No. 176,465, dated April 25, 1876; application filed December 2, 1875.

*To all whom it may concern:*

Be it known that I, ABRAHAM G. W. FOSTER, of Newnan, in the county of Coweta and State of Georgia, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the arrangement and combination of parts that will be more fully described hereinafter, whereby the plow is made reversible.

The accompanying drawings represent my invention.

$a$ represents the beam; $b$, the handles; $c$, the supports, and $d$ the clevis, all constructed in any manner preferred. The standard $e$, instead of being constructed in the usual manner, has its upper part made in the two branches $g$, which are so shaped, in relation to each other, that they straddle the beam, and thus one branch is secured to one side, and the other branch to the other.

By this construction the draft is brought more in line with the forward motion of the team, instead of being thrown so far to one side. The strain is more evenly balanced upon the standard, and, by making the ends of the branches adjustable up and down, the plow can can be made to cut as deep or shallow as may be preferred.

The front side of the lower end of the standard is made perfectly flat, and has two bolt-holes made through it. The mold-board is secured to a flange, 5, that projects from the top inner edge of the land-side $h$. This land-side is arched up at $i$, and then extends along the ground a suitable distance, as shown, and has extending up from its rear end the brace $l$, which brace has its upper end bolted to a projection, $o$, formed on the rear edge of the standard.

It is intended that there shall be a separate land-side for right-hand mold-boards, and a separate one for left-hand mold-boards, and, as both are equally well adapted to be applied to the standard, it will be seen that either one can be taken off and the other one put on, as circumstances may require.

The lower end of the standard, at 6, is made flat, so that when both land-sides are removed a common shovel may be attached by means of the bolts 2, and thus a single implement may be used for almost every kind of work.

Having thus described my invention, I claim—

1. The adjustable standard $e$, having its upper part divided into the branches $g$, curved to straddle the beam, one in the rear of the other, and provided with the seat 6, to receive various kinds of shovels or a land-side and mold-board, as shown and described.

2. The combination of the standard $e$, having the seat 6, land-side $h$, having seat 5, and arm $l$, and the mold-board, the parts being arranged and constructed as shown.

In testimony that I claim the foregoing I have hereunto set my hand this 22d day of November, 1875.

ABRAHAM G. W. FOSTER.

Witnesses:
JOHN S. BIGBY,
ORLANDO McCLENDON.